United States Patent
Biddle et al.

(10) Patent No.: US 10,956,671 B2
(45) Date of Patent: Mar. 23, 2021

(54) SUPERVISED MACHINE LEARNING MODELS OF DOCUMENTS

(71) Applicant: International Business Machines Corporation, Armonk, NY (US)

(72) Inventors: Edward James Biddle, Winchester (GB); Sujatha B. Perepa, Durham, NC (US); Avinash Asthana, London (GB)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 16/205,847

(22) Filed: Nov. 30, 2018

(65) Prior Publication Data

US 2020/0175106 A1    Jun. 4, 2020

(51) Int. Cl.
*G06F 40/279* (2020.01)
*G06N 20/00* (2019.01)

(52) U.S. Cl.
CPC ........... *G06F 40/279* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 9,754,216 B2 | 9/2017 | Ghosh | |
| 2011/0072052 A1* | 3/2011 | Skarin | G06F 16/22 707/794 |
| 2014/0189501 A1* | 7/2014 | Demiralp | G06F 40/279 715/243 |
| 2014/0359421 A1 | 12/2014 | Allen | |
| 2016/0147399 A1 | 5/2016 | Berajawala | |
| 2016/0162464 A1 | 6/2016 | Munro | |
| 2018/0232567 A1* | 8/2018 | Dolsma | G10L 17/26 |
| 2018/0357439 A1* | 12/2018 | Osotio | G06N 20/00 |
| 2019/0065453 A1* | 2/2019 | Bulgakov | G06F 40/30 |
| 2019/0102430 A1* | 4/2019 | Wang | G06F 16/367 |
| 2019/0109809 A1* | 4/2019 | Wang | G06N 5/022 |
| 2019/0392398 A1* | 12/2019 | Bastide | H04L 67/306 |

* cited by examiner

*Primary Examiner* — Howard Cortes
(74) *Attorney, Agent, or Firm* — Brian D. Welle (57) ABSTRACT

Concepts for managing a supervised machine learning model of a set of documents are presented. A system obtains annotated versions of the documents, the documents being annotated by annotators. A conflict between a plurality of annotations of the annotated versions of the documents is identified. The machine learning model includes a set of entities and relations defining relationships between entities. The identified conflict is resolved by at least one of identifying the correct annotation between the conflicting options, splitting the annotated text into two separate entities or relations, generating a new entity at the same or a less specific hierarchical level as the entities or relation in conflict, and/or changing an annotation of the annotated version of the document.

20 Claims, 5 Drawing Sheets

SUPERVISED MACHINE LEARNING MODELS OF DOCUMENTS

BACKGROUND

Supervised Machine Learning (ML) is useful for analyzing a large set of documents that are complex and/or use domain-specific language. For example, a ML model in the medical domain may be used to read through dense content in a time-efficient manner. Supervised machine learning may include processing the annotations of one or more annotators who, e.g., have expertise in the domain of the respective documents. By analyzing a body of annotations relating to a "corpus" of documents, a computer system may effectively "learn" about one or more subjects.

SUMMARY

Aspects of the disclosure relates generally to the field of managing a supervised machine learning model of documents. Aspects of the disclosure relate to a computer-implemented method for managing a supervised machine learning model for any given domain that is trained with a set of documents.

Aspects of the disclosure also relate to a computer program product including computer program code for implementing a proposed method when executed by a processing unit. Aspects of the disclosure also relate to a processing system adapted to execute this computer program code. Aspects of the disclosure further relate to a system for managing a supervised machine learning model of a set of documents.

Some aspects of the disclosure relate to a computer-implemented method for managing a supervised machine learning model of a set of documents. The method comprises obtaining a machine learning model of a set of documents, the machine learning model including a set of entities and relations defining relationships between entities. The method also comprises obtaining annotated versions of the documents, the documents being annotated by annotators. The method further comprises identifying a conflict between a plurality of annotations of the annotated versions of the documents, the conflict relating to a part of text that maps to entity mentions or relations between entities that belong to the machine learning model. The method also comprises resolving the identified conflict. Resolving the identified conflict comprises at least one of: identifying the correct annotation between the conflicting options; splitting the annotated text into two separate entities or relations; generating a new entity at the same or higher hierarchical level as the entities or relation in conflict; and changing an annotation of the annotated version of the document.

According to another aspect of the invention, there is provided a computer program product for managing a supervised machine learning model of a set of documents. The computer program product comprises a computer readable storage medium having program instructions embodied therewith, the program instructions executable by a processing unit to cause the processing unit to perform a method according to a proposed embodiment.

According to another aspect of the invention, there is provided a processing system comprising at least one processor and the computer program product according to an embodiment. The at least one processor is adapted to execute the computer program code of said computer program product.

According to yet another aspect of the invention, there is provided a system for managing a supervised machine learning model of a set of documents. The system comprises an interface component configured to obtain a machine learning model of a set of documents. The machine learning model includes a set of entities and relations defining relationships between entities. The system also comprises an annotation component configured to obtain annotated versions of the documents, the documents being annotated by annotators. The system further comprises a conflict identification component configured to identify a conflict between a plurality of annotations of the annotated versions of the documents, the conflict relating to a part of text that maps to entity mentions or relations between entities that belong to the machine learning model. The system also comprises a conflict resolution component configured to resolve the identified conflict. Resolving the identified conflict comprises at least one of: identifying the correct annotation between the conflicting options; splitting the annotated text into two separate entities or relations; generating a new entity at the same or higher hierarchical level as the entities or relation in conflict; and changing an annotation of the annotated version of the document.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

It should be understood that the figures are merely schematic and are not drawn to scale. It should also be understood that the same reference numerals are used throughout the figures to indicate the same or similar parts. Aspects of this disclosure relate to methods that may be processes for execution by a computer, i.e., may be a computer-implementable method. The various steps of the method may therefore reflect various parts of a computer program, e.g., various parts of one or more algorithms. Also, in the context of the present application, a system may be a single device or a collection of distributed devices that are adapted to execute one or more embodiments of the methods of the present invention. For instance, a system may be a personal computer (PC), a server, or a collection of PCs and/or servers connected via a network such as a local area network, the Internet, or so on, such that components of the system are configured to cooperatively execute at least one embodiment of the methods of the present invention.

Aspects of this relate to managing machine learning models for documents. Machine learning models may include "entities" which may be one or more words, terms, acronyms, phrases, or the like. Further, machine learning models may include "relations" (interchangeably referred to herein as relationships) which may include logical relationships or connections between entities. Relations may include grammatical relationships, definitional relationships, syntactical relationships, or the like. Further, machine learning models may relate to or otherwise include one or more "topics" which are subjects or domains across which entities and relations are relatively consistent. For example, topics may include a "medical" topic or a "mechanical" topic, which may each relate to a plurality of more specific topics (e.g., "cardiac" or "orthopedic" for medical and "automotive" or "biomechanical" for mechanical).

Annotators may evaluate documents and submit annotations (e.g., metadata or tags attached to the documents) relating to the machine-learning model. Annotators may include human users who have exposure and/or expertise to one or more entities, relationships, and/or topics. For example, annotators may be subject matter experts (SMEs) in the topic of the document. Through that annotations submitted by the annotators, a system may create a plurality of logical rules on which a model may be trained.

During the annotation process, different annotators annotating a set of documents may have different interpretations of text within documents for any of a number of reasons. As a result of these different interpretations, annotations as submitted by the annotators may include one or more conflicts. Conflicts may include discrepancies, differences, and/or inconsistencies between annotations. For example, two annotators may submit two annotations for one or more entities or relations that are inconsistent with each other. Such discrepancies, differences, and/or inconsistencies between annotations may interchangeably referred to herein as "annotation conflicts" or just "conflicts."

In some examples, a team of annotators may utilize a monitoring tool that may help the team to decide which annotation to pick as the preferred or correct option for the system. However, this tool may therein require a manual process with no means of deciphering whether a certain decision to pick an annotation was the right one or not or whether it was a case of modifying the machine learning model. This may set back machine learning processes and workflows, causing delays or poorly performing annotation models. Further, where there is a large amount of conflict between different annotators, the cause may be attributed to one or both of the machine learning model being wrong or confusing where two entities or relations are similar or overlapping (such that the entities or relations may be seen as ambiguous between annotators), or a lack of understanding of an annotator as to how to annotate documents for the machine learning model. As such, it may be difficult or impossible to use this monitoring tool to determine that, e.g., a conflict may be resolved by using a new annotation (e.g., rather than those offered by the annotators in conflict and/or an annotation currently utilized by the machine learning model), and/or that a conflict may be resolved by modifying a current annotation (e.g., by dividing the annotated entity into smaller entities).

Aspects of this disclosure relate to analyzing the annotation conflicts to evaluate whether one annotation of the conflict is relatively more functional, satisfactory, and/or optimal than other annotations of the conflict. Where it is identified that one annotation of the conflict is "better" in this way, aspects of the disclosure may relate to suggesting or otherwise automatically utilizing or correcting current and/or historical annotations to this preferred annotation. Further, aspects of the disclosure may relate to recommending an improvement to the machine learning model. For example, a system may recommend an improved annotation for the machine learning model by joining numerous disparate annotations together into a single annotation. Alternatively, where an entity may be a series of words, aspects of the disclosure may relate to breaking up the series of words into two or more different entities.

In some examples, aspects of this disclosure may relate to an Annotation Agreement Manager (AAM) that is configured to monitor conflict resolution and determine if there are patterns that may be automatically learnt and applied by the system. For example, the AAM may detect if a particular (e.g., first) annotator is consistently (annotating a certain entity or a certain type of entities incorrectly or otherwise suboptimally. The AAM may determine that an annotator is consistently annotating entities or relations incorrectly by identifying that the annotator is involved in a conflict type (e.g., conflicts that arise from the annotator annotating one or more terms with one or more incorrect annotations) a threshold number of times, or that the annotator is involved in a conflict type at more than a threshold rate. In response to this detection, the AAM determine that the first annotator does not fully understand how to correctly annotate the entity type. Aspects of the system may alert the AAM with data related to such determinations. Further, the AAM may be configured to automatically (e.g., autonomously and substantially immediately) resolve these kinds of conflicts (e.g., by instead utilizing an annotation of a preferred or more accurate annotator). Aspects of the system may also use such information to autonomously update and/or correct annotations of documents that the first annotator has annotated (and which have not been reviewed by other annotators).

Additionally, or alternatively, the AAM may identify a pattern of conflicts in that one or more entities or relations are misused regardless of the annotators. For example, the AAM may identify that both annotators with relatively high and relatively low accuracy scores are involved in similar conflicts with the entities and/or relations of the machine learning model. In response to detecting this, the AAM may determine that the entities and/or relations of the conflicts are themselves suboptimally categorized and/or defined, and may re-define and/or recategorize these entities to be more aligned with how these conflicts have been resolved. Alternatively, the AAM may determine to simply remove these entities and/or relations (e.g., replacing the entities with a new entities on a more generic higher hierarchical level).

Such systems may therefore flag, correct, or otherwise identify conflicts in documents that are annotated by different annotators. In this way systems of this disclosure may be configured to enable improved management and/or optimization of machine learning models of documents. For example, systems and methods of this disclosure may eliminate and/or reduce the number and/or severity of shortcomings of other annotation concepts which may require or otherwise utilize excessive user input and/or supervision for generating and managing machine learning (ML) models.

Figure 1:
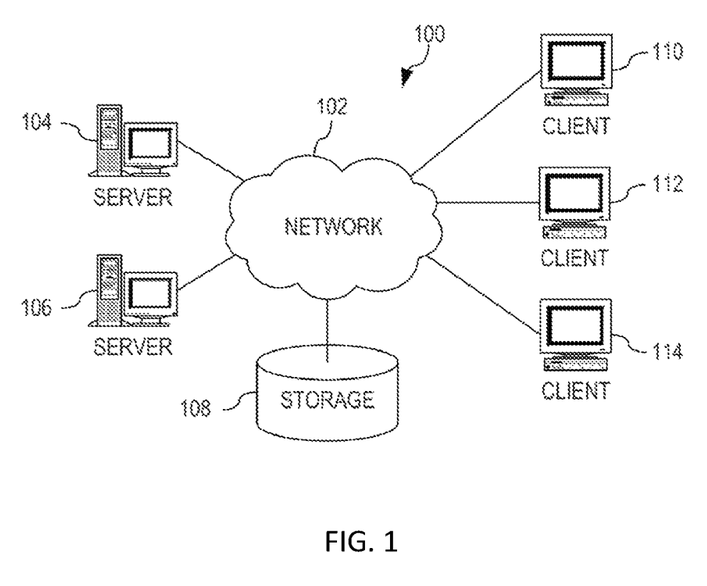
FIG. 1 depicts a conceptual and schematic illustration of an example distributed system that includes a computing system configured to manage annotations sent by client devices via a network to machine learning models stored on servers.
Figure 2:
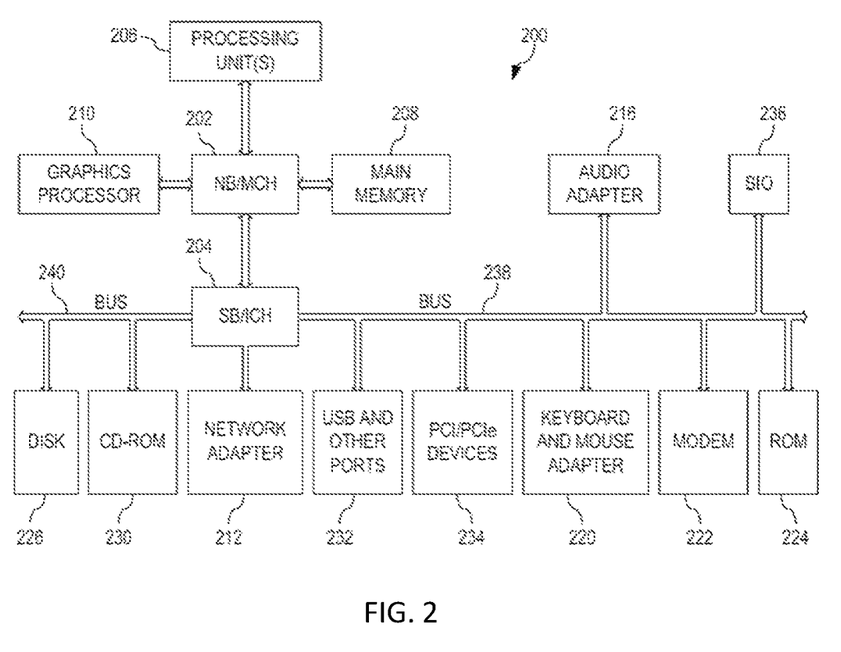
FIG. 2 is a conceptual and schematic block diagram of the client devices of FIG. 1.

In order to provide a context for the description of elements and functionality of the illustrative embodiments, FIGS. 1 and 2 are provided hereafter as example environments in which aspects of the disclosure originate (e.g., where annotations originate) and/or are implemented. It should be appreciated that FIGS. 1 and 2 are only examples and are not intended to assert or imply any limitation with regard to the environments in which aspects or embodiments of the present disclosure may originate or be implemented. Many modifications to the depicted environments may be made without departing from the spirit and scope of this disclosure.

FIG. 1 depicts a conceptual and schematic representation of a distributed system in which aspects of the disclosure may be implemented. Distributed system 100 may include a network of computers. The distributed system 100 may include at least one network 102. The network 102 may include a medium used to provide communication links between various devices and computers connected together within the distributed data processing system 100. The network 102 may include connections, such as wires, wireless communication links, fiber optic cables, or the like.

In some examples, the distributed system 100 may include the Internet with the network 102 representing a worldwide collection of networks and gateways that use, e.g., the Transmission Control Protocol/Internet Protocol (TCP/IP) suite of protocols to communicate with one another. In some examples, the network 102 may include a plurality of networks, such as public networks (e.g., which are relatively accessible to all or most or many users) or private networks (e.g., networks behind a computer firewall), one or more intranets, local area networks (LANs), wide area networks (WANs), or the like. As stated above, FIG. 1 is intended as an example, not as an architectural limitation for different embodiments of this disclosure, and therefore, the particular elements shown in FIG. 1 should not be considered limiting with regard to the environments in which examples of this disclosure may be implemented.

In the depicted example, a first server 104, a second server 106, a storage unit 108, clients 110, 112, 114, and an annotation management system 400 are also connected to the network 102. The distributed processing system 100 may include additional servers, clients, systems and other devices not shown in other examples. Servers 104, 106 may provide data, such as boot files, operating system images, applications, documents, entities, relationships, and the like to the clients 110, 112, and 114. While each of the clients 110, 112, and 114 may be clients to either server 104, 106, for purposes of clarity clients 110, 112, and 114 are discussed predominantly as clients to the first server 104. The clients 110, 112, 114 may be, for example, personal computers, network computers, or the like. Clients 110, 112, 114 may be utilized by annotators to submit annotations over network 102. Clients 110, 112, 114 may submit annotations for documents supplied by one or more servers regarding machine learning models. Machine learning models, documents, annotations, and the like may be stored by the storage unit 108.

As discussed herein, the annotation management system 400 may manage and/or generate supervised machine learning models of documents, and therein provide a dynamic resolution of annotation conflicts. For example, the annotation management system 400 may be configured to identify a conflict between a plurality of annotations. The annotation management system 400 may resolve this identified conflict by, e.g., identifying the correct annotation between the conflicting options, splitting the annotated text into two separate entities or relations, generating a new entity at the same or higher hierarchical level as the entities or relation in conflict, or changing an annotation of the annotated version of the document. Hierarchical levels may relate to a specificity of the entity, where relatively more specific entities that correspond to less words or phrases may be on a "lower" hierarchical level and relatively less specific entities that correspond to more words or phrases may be on a "higher" hierarchical level.

For example, a machine learning model may include two entities (apples and oranges) and the annotation management system 400 may detect that in one or more documents a third entity (pears) is annotated as either the first or second entity (e.g., due to a lack of third option). In response to detecting this, the annotation management system 400, may recommend annotating the third entity as an annotation that corresponds uniquely to this third entity. Alternatively, or additionally, the annotation management system 400 may provide a recommendation to the AAM (which may be a component of the annotation management system 400) to go "up" a level and create a parent entity ("fruit") which may be used to annotate each of the first, second, and third entities. In this way, the annotation management system 400 may create a parent annotation (fruit) that may indicate the child entities (apples, bananas, pears) as belonging to or being associated with this one parent annotation.

Accordingly, the annotation management system 400 creates new entities (e.g., words or phrases or the like) that are not present in an ontology (comprising a set of words or phrases that the machine learning model is meant to be trained on) of the storage unit 108. Further, as described herein, the annotation management system 400 may also be configured to split existing annotated entities into multiple separate entities.

Further, the annotation management system 400 may include modifications and additions to a traditional ML system that may enhance the value and utility of the proposed concepts. For example, the annotation management system 400 may manage or include extensions (e.g., software add-ons) to existing annotation systems and/or supervised ML systems. Such extensions may enable the provision of additional capabilities for resolving conflicts in annotated documents. In this way, an annotation system supervised ML system may be upgraded by implementing or 'retro-fitting' this ML system with an extension that relates to aspects of this disclosure.

In some examples, the annotation management system 400 may be configured to identify a pattern of conflicts, and, based on the identified pattern of conflicts, change one or more annotations of the annotated version of the document.

In some examples, the annotation management system 400 may be configured to generate an accuracy score that indicates a level of annotation accuracy of an annotator. The accuracy score may relate to a given entity or relation based on the identified pattern of conflicts. Further, the generated accuracy score may be associated with the entities or relations annotated by the annotator. Resolving the identified conflict may then be based on the accuracy score associated with the entities or relations annotated by the annotator.

In some examples, the annotation management system 400 may identify a conflict between a plurality of annotations of the annotated versions of the documents by extracting a topic from the document. Once extracted, the annotation management system 400 may analyze the extracted topic and the machine learning model of the document to identify a discrepancy between the extracted topic and the annotations of entities and relations.

FIG. 2 is a block diagram of an example computing system 200 of client 110 in FIG. 1, in which computer usable code or instructions implementing the processes described herein may be located. Though the computing system 200 is described as being of client 110, it is to be understood that clients 112, 114 may utilize substantially similar structures.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system may run on the processing unit 206. The operating system may coordinate and control various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

In examples where client 110 is a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs may be located on storage devices, such as HDD 226, and may be loaded into main memory 208 for execution by processing unit 206. Similarly, one or more message processing programs may be adapted to be stored by the storage devices and/or the main memory 208.

The processing unit 206 may execute one or more processes and/or techniques of this disclosure using computer usable program code, which may be located in a memory such as, for example, main memory 208, ROM 224, or in one or more peripheral devices 226 and 230. For example, the processing unit 206 may execute instructions that result in the system 200 sending one or more annotations over network 102 to the first server 104.

A bus system, such as first bus 238 or second bus 240 as shown in FIG. 2, may comprise one or more buses. The bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary in different examples. Other internal hardware or peripheral devices, such as flash memory, equivalent non-volatile memory, or optical disk drives and the like, may be used in addition to or in place of the hardware depicted in FIGS. 1 and 2. Also, the processes described herein may be executed by a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
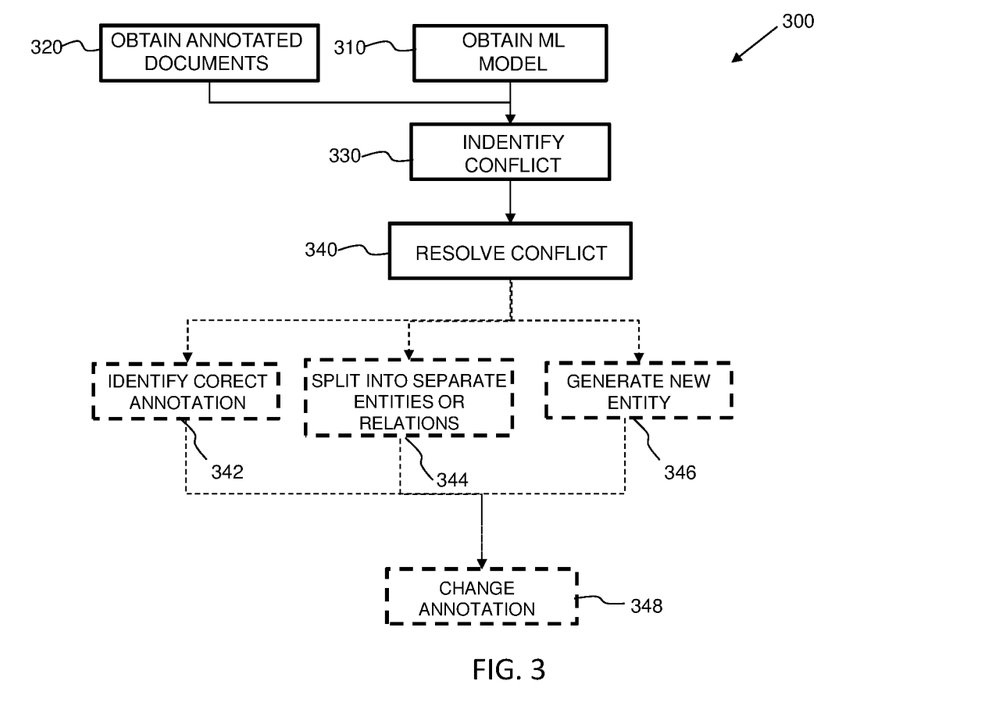
FIG. 3 depicts a flowchart of an example method of managing annotations for a system.

FIG. 3 depicts a flowchart of a method 300 by which the annotation management system 400 may manage annotations. The annotation management system 400 may obtain a machine learning model (310). The machine learning model may relate to a set of documents. For example, the machine learning model may include a set of entities and relations defining relationships between entities. The annotation management system 400 may receive annotated versions of the documents (320). The annotated versions of the documents may include versions (e.g., copies) of the documents that have been annotated by various annotators. The annotations may be included within metadata such as tags.

The annotation management system 400 may identify a conflict between a plurality of annotations of the annotated versions of the documents (330). For example, the identified conflict may relate to a part of text that maps to (e.g., is tagged by or otherwise correlated with) entity annotations, or the identified conflict may relate to a part of text that maps to relations between entities that belong to the machine learning model. By way of example, the annotation management system 400 may identify a topic from the document and analyze the extracted topic and the machine learning model of the document to identify a discrepancy between the extracted topic and the annotations of entities and/or relations.

The annotation management system 400 resolves the identified conflict (340). For example, the annotation management system 400 may resolve the conflict by any of the steps 342, 344, 346, 348. Implementation of one or more of these steps is indicated in FIG. 3 by the dashed lines of FIG. 3. Accordingly, in some examples, one or more of the steps 342, 344, 346, 348 may not be executed, and/or may not be executed in the depicted order, when the annotation management system 400 resolves the identified conflict.

In some examples, the annotation management system 400 may resolve the conflict by identifying the correct annotation between the conflicting options (342). Once the annotation management system 400 identifies the correct annotation, the annotation management system 400 may split the annotated text into a plurality of separate entities or relations (344). Further, once the annotation management system 400 splits the annotated text, the annotation management system 400 may generate a new entity at the same or less specific (e.g., higher) hierarchical level as the entities or relation in conflict (346). In some examples, generating a new entity or relation for the conflict in question at the same or less specific hierarchical level as the entities or relation in conflict may include annotating text as a new entity or relation. The annotation management system 400 may then change an annotation of the annotated version of the document (348). Changing the annotation may include changing the annotation to be consistent with the resolution (e.g., splitting the annotation, updating the annotation to the correct annotation, etc.).

It will be appreciated that, as a result of undertaking the method 300 of FIG. 3, the annotation management system 400 may resolve annotation conflicts of annotated documents and/or a machine learning model managed so as to assist in avoiding further conflicts between annotated documents.

Figure 4:
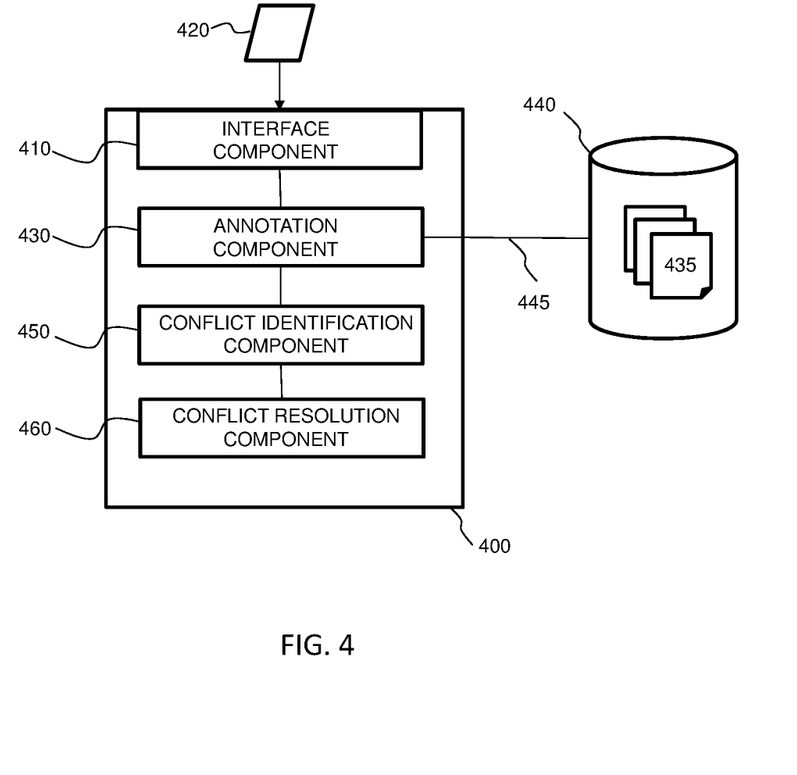
FIG. 4 is a conceptual block diagram of example logic components of the computing system of FIG. 1.

FIG. 4 depicts a conceptual and schematic block diagram of an annotation management system 400 for managing a supervised machine learning model of a set of documents according to an embodiment. The system comprises an interface component 410. The interface component 410 may be configured to obtain a machine learning model 420 of a set of documents. The machine learning model 420 may include a set of entities and relations defining relationships between entities.

The annotation management system 400 may include an annotation component 430 that is configured to obtain annotated versions 435 of the documents. The annotated versions 435 of the documents may be annotated by annotators. In some examples, the annotation component 430 may be adapted to retrieve the annotated versions 435 of the documents from a data storage component 440. The data storage component 440 may be accessed via a communication link 445 (e.g., a wired or wireless communication link, or a combination thereof). In some examples, the annotated versions 435 of the documents may be provided via a remotely-located data repository, thus enabling remotely-located annotators to provide annotated versions 435 of the documents via, e.g., the Internet.

A conflict identification component 450 of the system may be configured to identify a conflict between a plurality of annotations of the annotated versions of the documents. The conflict may relate to a part of text that maps to entity mentions or relations between entities that belong to the machine learning model. For example, the conflict identification component 450 of this embodiment may be configured to extract a topic from the documents and to therein analyze the extracted topic and the machine learning model of the documents to identify a discrepancy between the extracted topic and the annotations of entities and relations.

A conflict resolution component 460 is configured to resolve the identified conflict. For instance, the conflict resolution component 460 is configured to resolve the identified conflict by identifying the correct annotation between the conflicting options, splitting the annotated text into two separate entities or relations, generating a new entity at the same or more generic/higher hierarchical level as the entities or relation in conflict, and/or changing an annotation of the annotated version of the document.

By way of further explanation, additional examples in accordance with proposed concepts will now be described.

In order to detect an issue where the machine learning model is ambiguous, conflicting annotations covering text and entity type data is extracted from the annotation agreement process.

An unsupervised topic modeling function may be undertaken by extracting key topics from the documents using a Term Frequency-Inverse Document Frequency (TF-IDF) approach. In information retrieval, TF-IDF is a statistic that may indicate a relative "importance" of a word or term to a single document and/or to a collection of documents (e.g., a corpus of documents). The annotation management system 400 may use TF-IDF as an information retrieval technique by weighing a term frequency (TF) of a given term as well as an inverse document frequency (IDF) of the term. The annotation management system 400 may thus determine a respective TF and IDF "score" of each term. The product (e.g., numerical value of the multiplied amount) of the TF and IDF scores of a term may indicate a TF-IDF "weight" of that term, where higher weights indicate rarer terms, and lower weights indicate more common terms. The annotation management system 400 may use a TF-IDF algorithm to determine a weight of a keyword within a corpus and therein assign a relative "importance" to that keyword based on the keyword's frequency.

The annotation management system 400 may map extracted topics to a publicly available ontology (e.g., ML model). Once extracted, the annotation management system 400 may compare the topics to the machine learning model to determine if the topic is relevant. In this way, annotation management system 400 may "link" entities from the machine learning model with the extracted topics that exist in the same hierarchical branch of the ML model. If the annotation management system 400 determine that the topic and the type match but occur at different levels, the annotation management system 400 may record this difference. The annotation management system 400 may store topics that the annotation management system 400 identifies as being closely related to the machine learning model. In this way, annotation management system 400 may build an association model between the extracted topics and the machine learning model.

For example, a machine learning model may include two entities: Team A and Team B. In a document, the annotation management system 400 may determine that "Team C" is annotated to Team A and/or Team B due to a lack of third option. In this example, the annotation management system 400 may be configured to recommend annotating this mention as "Team C" (e.g., based on the document text). Alternatively, or additionally, the annotation management system 400 may be configured to recommend the AAM to go "up" a level and create an entity "Soccer Teams" which may annotate Team A, Team B and Team C as one. The annotation management system 400 may be configured to suggest a new entity that is unique to the term or create a "parent" entity that encompasses other entities based on, e.g., the other annotations and their determined weights. For example, where the annotation management system 400 determined that Team C had a relatively high TF-IDF score (indicating that Team C was a relatively infrequent term), the annotation management system 400 may determine to create a new parent entity rather than create a new entity that is unique to Team C. Alternatively, where the annotation management system 400 determined that each of Team A, Team B, and Team C had relatively similar TF-IDF scores, the annotation management system 400 may determine to create a new entity for Team C.

In some examples, the annotation management system 400 may be configured to analyze conflicts against a historical record of conflicts in response to receiving an indication that annotators are starting the annotation process. The historical record of conflicts may be stored within the annotation management system 400, or the historical record of conflicts may be stored in a storage database accessible to the annotation management system 400 (e.g., a storage database similar to the storage 108 of FIG. 1). For example, the annotation management system 400 may be configured to analyze the historical record of annotation conflicts and see if the two annotators have had a similar conflict in other instances. Where the two annotators have had similar conflicts, the annotation management system 400 may determine whether there are more than two annotators. In examples where there are more than two annotators, the annotation management system 400 may identify what terms, annotations, and/or entities the other annotators (e.g., other than the two annotators in conflict) have used in annotating the respective series of words in comparison to the two annotators in conflict. By comparing the annotations of the two annotators in conflict with other annotators, the annotation management system 400 may identify the set of annotator's common understanding of the series of words. Once identified, the annotation management system 400 may run a simulation on some or all of the annotations of those series of words to determine an accuracy metric of the assorted annotations. The accuracy metrics may include a score or precision score that indicates which annotation would benefit the ML model the most.

In some examples, in addition to annotating words, annotators may identify topics of documents. In such examples, the annotation management system 400 may map the series of words to some or all topics identified in this process. If the annotation management system 400 identifies that one or more series of words is a subset or equivalent to any set of words, the annotation management system 400 may recommend the new concept as a potential addition to the machine learning model. Additionally, or alternatively, the annotation management system 400 may recommend breaking down the annotation as a set of two entities, therein associating the two entities together with a relation as necessary.

As described herein, in some examples an annotator may incorrectly annotate one or more terms due to a mistake or a confusion or the like. In such examples, the annotation management system 400 may be configured to calculate an annotator score (e.g., accuracy score). For example, the annotation management system 400 may determine a score for each annotator. In some examples, the annotation management system 400 may determine a score for a plurality of annotators in relation to a plurality of topics. For each topic, the annotation management system 400 may determine such a score where positive credit is applied for each time their annotation is accepted as the correct interpretation of the conflicting entity type in question and negative credit is applied for each time their annotation is rejected. In this way, annotation management system 400s may identify the relative strengths and weaknesses of respective annotators with regards to a particular topic within the machine learning model. In some examples, the annotation management system 400 may further use these scores to resolve future conflicts between annotators. For example, if a term in document relating to a specific topic is tagged with a first annotation that has a relatively high score in this topic by a first annotator and tagged with a second tag by a second and third annotator that both have a relatively low score in this topic, annotation management system 400 may identify the higher score by the first annotator in accepting and/or recommending the first tag for the term.

By undertaking the abovementioned approach, the annotation management system 400 may provide an understanding of the relative strengths and weaknesses of one or more annotators in relation to one or more terms, topics, or the like. Further, the annotation management system 400 may be configured to identify, select, provide, and/or recommend a record of the "right" annotation. In some examples, the annotation management system 400 may further evaluate one or more additional conflicts (e.g., as stored within a database of annotations) between the two or more conflicting annotators. For example, the annotation management system 400 may search for additional conflicts between the two or more conflicting annotators that relate to similar or identical terms, topics, conflicts, or the like. Once additional conflicts are identified, the system may further update annotations as stored in the database.

If an annotator is deemed to be at fault, the annotation management system 400 may auto-correct all relevant annotations of that same series of words in some or all of the non-overlapping documents annotated by the annotator.

In some examples, the annotation management system 400 may also be configured to identify a pattern of conflicts, and, based on the identified pattern of conflicts, change one or more annotations of an annotated version of a document. In this way, the annotation management system 400 may generate an accuracy score that indicates a level of annotation accuracy for a respective annotator based on the identified pattern of conflicts. Further, the annotation management system 400 may be configured to associate the generated accuracy score may with one or more of the entities or relations annotated by the annotator. In subsequent conflicts, the annotation management system 400 may be configured to resolve identified conflicts based on one or more accuracy scores associated with the entities or relations annotated by one or more annotators of the conflict.

Figure 5:
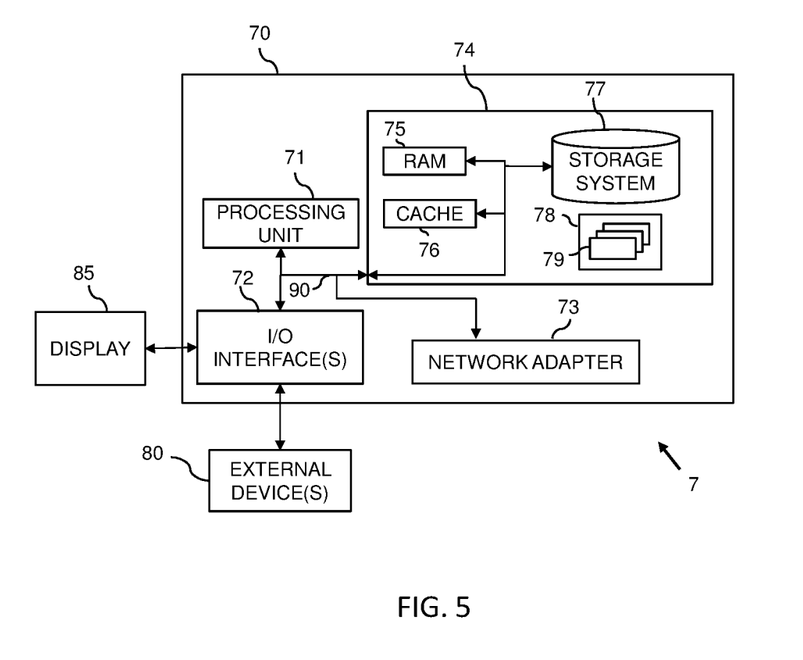
FIG. 5 is a conceptual and schematic illustration of the computing system of FIG. 1.

By way of further example, as illustrated in FIG. 4, annotation management system 400 may include a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 may include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication may occur via Input/Output (I/O) interfaces 72. Still yet, computer system/server 70 may communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e., is a computer-implementable method. The various steps of the method therefore reflect various parts of a computer program, e.g., various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for managing supervised machine learning of documents, the method comprising:
    obtaining a machine learning model of a set of documents, the machine learning model including a set of entities and relations defining relationships between entities, wherein each entity of the set of entities has a respective hierarchal level that indicates a relative specificity of the entity;
    obtaining annotated versions of the documents, the documents being annotated by annotators;
    identifying a set of conflicts between a plurality of annotations of the annotated versions of the documents, each of the set of conflicts relating to text that maps to at least one of an entity of the set of entities or a relation of the set of relations; and
    resolving each of the set of identified conflicts, wherein resolving the set of identified conflicts comprises at least one of:
        resolving a first identified conflict of the set of identified conflicts by splitting annotated text of the first identified conflict into two separate entities or relations,
        resolving a second identified conflict of the set of identified conflicts by generating a new entity at the same or a less specific hierarchical level as entities in the second identified conflict, and
        changing an annotation of the annotated version of the document for the first and second identified conflicts accordingly.

2. The method of claim 1, further comprising:
    identifying a pattern of conflicts; and
    based on the identified pattern of conflicts, changing one or more annotations of an annotated version of a document.

3. The method of claim 2, wherein identifying the pattern of conflicts includes identifying that a respective annotator is involved with a conflict type a threshold number of times or at more than a threshold rate.

4. The method of claim 3, further comprising:
    based on the identified pattern of conflicts, generating an accuracy score for indicating a level of annotation accuracy of the annotator for the conflict type; and
    associating the generated accuracy score with the conflict type of the annotator.

5. The method of claim 4, wherein the conflict type is associated with a respective entity or relation of the machine learning model and resolving each of the set of identified conflicts includes updating the annotation of the respective entity or relation based on the accuracy score of the annotator.

6. The method of claim 2, wherein identifying the pattern of conflicts includes identifying that a respective entity or relation of the machine learning model is involved with a conflict type a threshold number of times or at more than a threshold rate.

7. The method of claim 6, wherein resolving each of the set of identified conflicts includes modifying the respective entity or relation of the machine learning model.

8. The method of claim 1, wherein identifying the set of conflicts between the plurality of annotations of the annotated versions of the documents includes:
    identifying a topic of the document; and
    analyzing the topic and the machine learning model of the document to identify a discrepancy between the topic and the plurality of annotations.

9. The method of claim 1, wherein generating the new entity or relation for the conflict in question at the same or less specific hierarchical level as the entities in conflict comprises annotating text as a new entity.

10. A computer program product for managing supervised machine learning of documents, the computer program product comprising a computer readable storage medium having program instructions embodied therewith, the program instructions executable by a processing unit to cause the processing unit to:
    obtain a machine learning model of a set of documents, the machine learning model including a set of entities and relations defining relationships between entities, wherein each entity of the set of entities has a respective hierarchal level that indicates a relative specificity of the entity;

obtain annotated versions of the documents, the documents being annotated by annotators;

identify a conflict between a plurality of annotations of the annotated versions of the documents, the conflict relating to text that maps to at least one of an entity of the set of entities or a relation of the set of relations of the machine learning model; and resolve the identified conflict, wherein resolving the identified conflict comprises splitting annotated text of the identified conflict into two separate entities or relations and changing an annotation of the annotated version of the document accordingly.

11. The computer program product of claim 10, further including program instructions that, when executed by the processing unit, cause the processing unit to:

identify a pattern of conflicts; and based on the identified pattern of conflicts, change one or more annotations of an annotated version of a document.

12. The computer program product of claim 11, wherein identifying the pattern of conflicts includes identifying that a respective annotator is involved with a conflict type a threshold number of times or at more than a threshold rate, further including program instructions that, when executed by the processing unit, cause the processing unit to:

based on the identified pattern of conflicts, generate an accuracy score for indicating a level of annotation accuracy of the annotator for the conflict type; and associate the generated accuracy score with the conflict type of the annotator.

13. The computer program product of claim 11, wherein identifying the pattern of conflicts includes identifying that a respective entity or relation of the machine learning model is involved with a conflict type a threshold number of times or at more than a threshold rate.

14. The computer program product of claim 10, further including program instructions that, when executed by the processing unit, cause the processing unit to identify the conflict between the plurality of annotations of the annotated versions of the documents by:

identifying a topic of the document; and analyzing the topic and the machine learning model of the document to identify a discrepancy between the topic and the plurality of annotations.

15. A system for managing supervised machine learning of documents, the system comprising:

a processor; and a memory in communication with the processor, the memory containing program instructions that, when executed by the processor, are configured to cause the processor to perform a method, the method comprising:

obtaining a machine learning model of a set of documents, the machine learning model including a set of entities and relations defining relationships between entities, wherein each entity of the set of entities has a respective hierarchal level that indicates a relative specificity of the entity;

obtaining annotated versions of the documents, the documents being annotated by annotators;

identifying a conflict between a plurality of annotations of the annotated versions of the documents, the conflict relating to text that maps to at least one of an entity of the set of entities or a relation of the set of relations; and resolving the identified conflict, wherein resolving the identified conflict comprises generating a new entity at the same or a less specific hierarchical level as entities in the identified conflict and changing an annotation of the annotated version of the document accordingly.

16. The system of claim 15, the memory further including program instructions that, when executed by the processor, cause the processor to:

identify a pattern of conflicts; and based on the identified pattern of conflicts, change one or more annotations of an annotated version of a document.

17. The system of claim 16, wherein identifying the pattern of conflicts includes identifying that a respective annotator is involved with a conflict type a threshold number of times or at more than a threshold rate, the memory further including program instructions that, when executed by the processor, cause the processor to:

based on the identified pattern of conflicts, generate an accuracy score for indicating a level of annotation accuracy of the annotator for the conflict type; and associate the generated accuracy score with the conflict type of the annotator.

18. The system of claim 16, wherein identifying the pattern of conflicts includes identifying that a respective entity or relation of the machine learning model is involved with a conflict type a threshold number of times or at more than a threshold rate.

19. The system of claim 18, wherein resolving the identified conflict includes modifying the respective entity or relation of the machine learning model.

20. The system of claim 15, the memory further including program instructions that, when executed by the processor, cause the processor to identify the conflict between the plurality of annotations of the annotated versions of the documents by:

identifying a topic of the document; and analyzing the topic and the machine learning model of the document to identify a discrepancy between the topic and the plurality of annotations.

* * * * *